Figure 7:
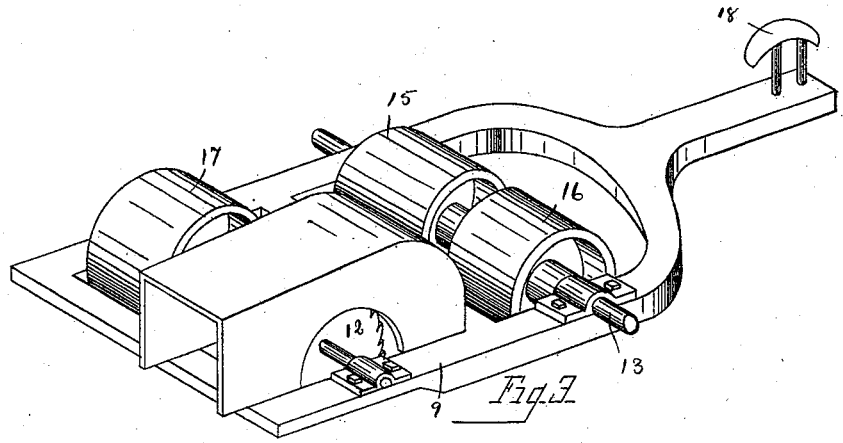

(No Model.) 4 Sheets—Sheet 1.
C. F. MILBURN, G. E. BYRKIT & J. C. CRABBS.
MACHINE FOR TURNING WOODEN AXLES.
No. 493,038. Patented Mar. 7, 1893.
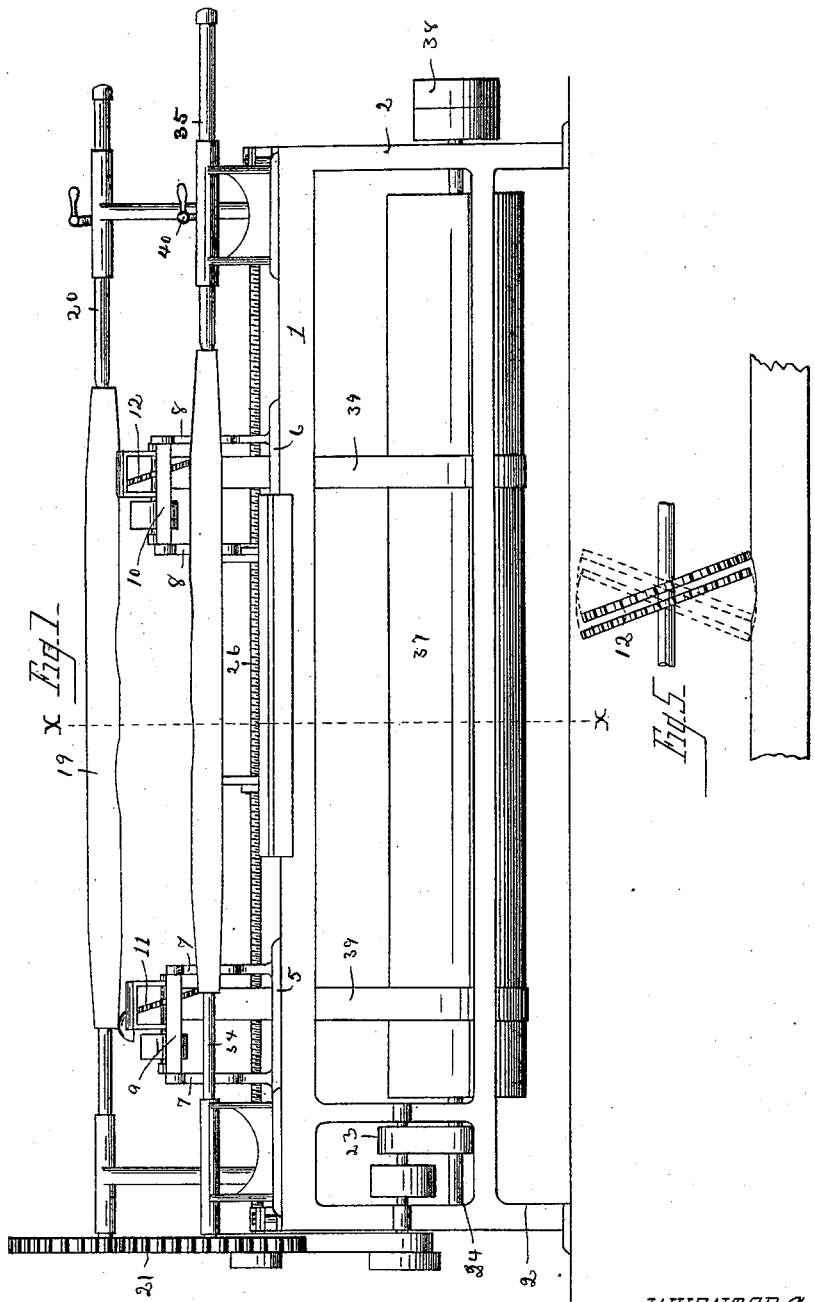
WITNESSES
Carroll J. Webster
[signature]
INVENTORS
Charles F. Milburn
George E. Byrkit
John C. Crabbs
By Myers & Webster
Att'ys

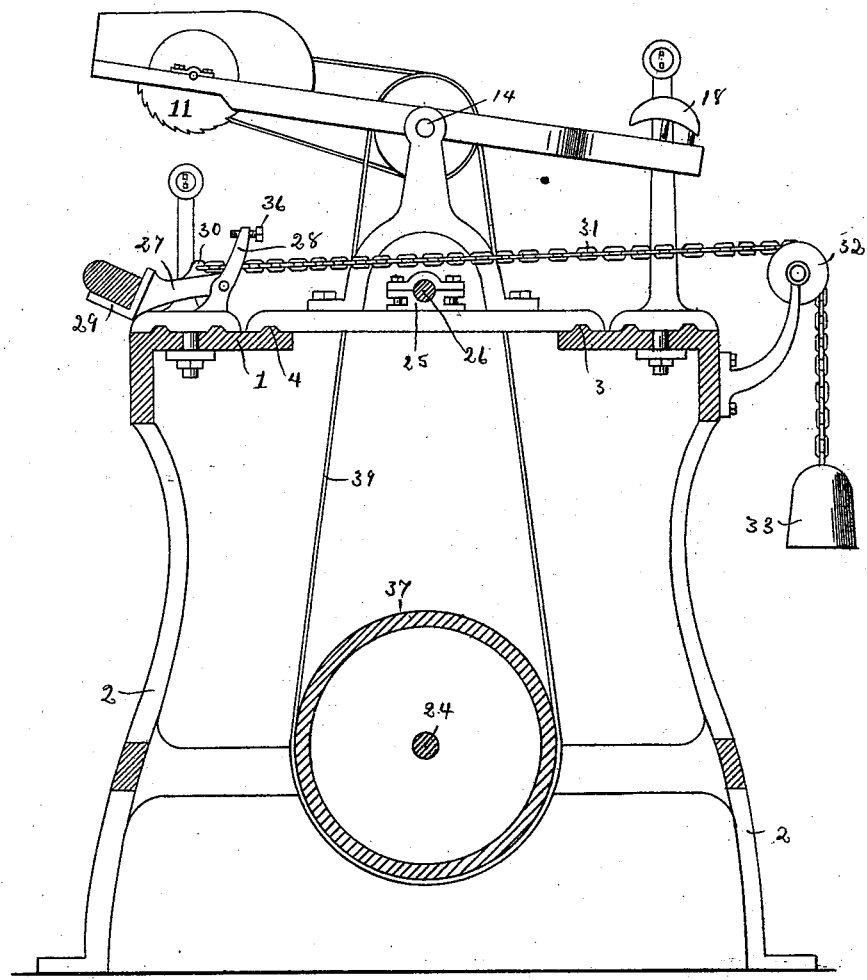

(No Model.) 4 Sheets—Sheet 3.
C. F. MILBURN, G. E. BYRKIT & J. C. CRABBS.
MACHINE FOR TURNING WOODEN AXLES.

No. 493,038. Patented Mar. 7, 1893.

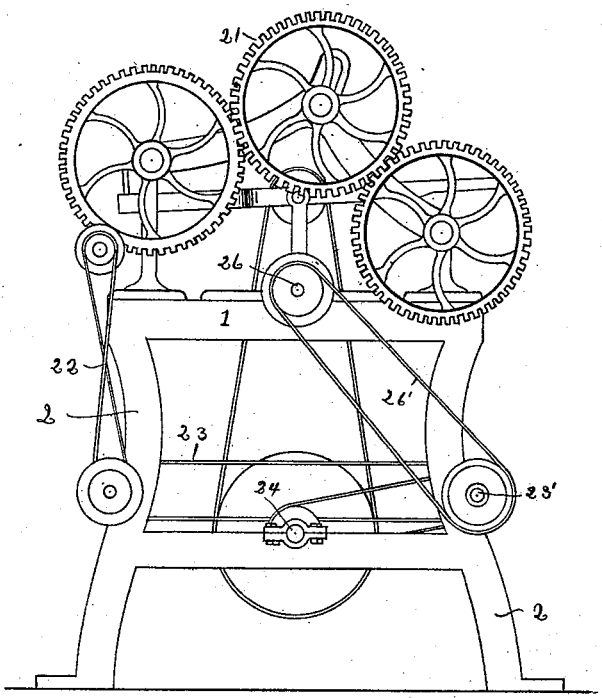

UNITED STATES PATENT OFFICE.

CHARLES F. MILBURN AND GEORGE E. BYRKIT, OF TOLEDO, AND JOHN C. CRABBS, OF AUBURNDALE, OHIO.

MACHINE FOR TURNING WOODEN AXLES.

SPECIFICATION forming part of Letters Patent No. 493,038, dated March 7, 1893.

Application filed July 18, 1890. Serial No. 359,144. (No model.)

*To all whom it may concern:*

Be it known that we, CHARLES F. MILBURN and GEORGE E. BYRKIT, of Toledo, and JOHN C. CRABBS, of Auburndale, in the county of Lucas and State of Ohio, have invented certain new and useful Improvements in Machines for Turning Wooden Axles; and we do hereby declare that the following is a full, clear, and exact description of the invention, which will enable others skilled in the art to which it appertains to make and use the same, reference being had to the accompanying drawings, and to the figures of reference marked thereon, which form part of this specification.

This invention relates to machines for turning wagon axles.

The object of the invention is to provide a lathe having mechanism adapted to make a semi-circular or concave cut transversely of the grain of the axle or stock, whereby, the rapid cutting away of the blank to form the spindles can be accomplished without any danger of raising the grain of the wood, or of splitting the same, inasmuch as the cutting is done after the manner of an ordinary hand-gouge.

A further object is to produce a centering device to be used in conjunction with the cutting mechanism, so as to bring the body of the blank in line with the spindles, in contra-distinction to the usual mode of centering the spindles irrespective of the body of the blank.

A further object is to produce mechanism for cutting both spindles of an axle simultaneously, whereby, the work of manufacturing axles will be expedited to such an extent that one machine can be made to do the work of two machines, while but one attendant will be required to operate it.

With these objects in view, the invention consists in providing a lathe with a duplex cutting mechanism consisting of two wabble-saws carried by separate cutter-heads, and connecting the two in such a manner that both will operate in unison, and yet be independent of each other.

The invention further consists in providing a centering device to be used in connection with the saws, consisting of a support provided with a counter-poise designed to keep the said support in a raised position when the blank is being centered.

The invention further consists in the various novel details of construction as will be hereinafter fully described and claimed.

In the accompanying drawings forming part of this specification and in which like numerals of reference indicate corresponding parts, we have illustrated one form of device embodying the essential features of our invention, although the same may be carried into effect in other ways, without in the least departing from the spirit thereof.

Figure 4:
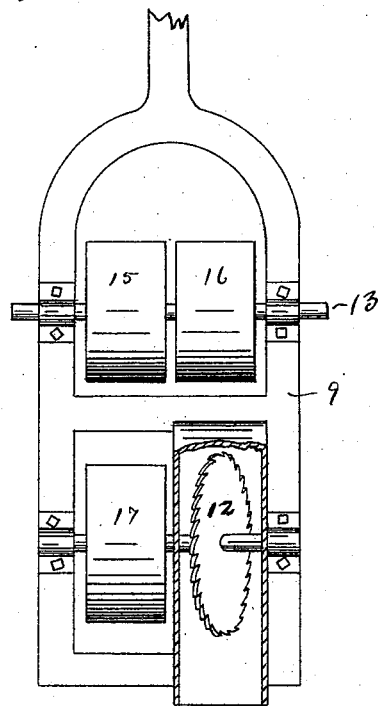

In the drawings: Figure 1, is a front elevation of a lathe showing the same provided with two wabble saws, also the mechanism for operating the same. Fig. 2, is a vertical transverse sectional view taken on the line *x—x* of Fig. 1, showing more particularly the centering device. Fig. 3, is a perspective view of one of the cutter-heads, removed from the machine. Fig. 4, is a top plan view of the same, partly broken away. Fig. 5, is a detached detail view, showing two wabble-saws mounted on one shaft, and the path of their travel then cutting, and, Fig. 6, is an end elevation, showing the mechanism for actuating the former and blank.

Referring to the drawings, 1, designates a rectangular frame, which is supported at each end upon suitable legs 2. The frame is provided with tracks 3 and 4, upon which move plates 5 and 6, carrying standards 7 and 8, in which are journaled frames 9 and 10, carrying wabble-saws 11 and 12. The frames 9 and 10, are pivoted upon shafts 13 and 14, which carry pulleys 15, 16, and 17. The shafts 13 and 14, form pivots upon which the frames vibrate, and carry at the end opposite that on which the wabble-saws are journaled, a tracer 18, which is adapted to engage the former 19, which latter is held in place by means of an adjustable center 20, motion being imparted to the said former by means of a series of gear wheels 21, which receive motion through a belt 22, which latter is actuated by means of a belt 23, carried by a shaft 23', which shaft is actuated by the drum-shaft 24. The standards 7 and 8, are provided with threaded boxes 25, which are adapted to be engaged by a worm-shaft 26, which extends the entire length of the machine, and is actuated by means of a belt 26', receiving motion from a pulley in the drum-shaft 24, as will be clearly seen by reference to Fig. 6. As shown the pitch of the thread of the worm-shaft extends in the same direction throughout its entire length, thereby causing the cutter-heads to move in the same direction, that is, for both to move from left to right or vice versa, but it will be obvious that if desired the said shaft may be made of two sections having its threads pitched in opposite directions, so that the heads may be caused to move from the ends of the machine to the center or the reverse thereof.

As stated in the first part of this specification, it is one of the objects of this invention to provide a centering device to be used in conjunction with the wabble-saws, so as to admit of the axle being centered longitudinally of its length, in contra-distinction to the usual mode of centering the spindles irrespective of any irregularity which may exist in the contour of the axle. The latter feature is of great importance inasmuch as wooden axles are frequently warped, and by centering the spindles only and turning them up to the desired configuration to accommodate the skein it frequently happens that the said skeins will be out of alignment thereby requiring additional labor to bring them into true alignment with each other. The centering device forming part of this invention overcomes this obstacle in a simple and effective manner, and is so constructed as to add very little to the cost of the production of a machine, and by referring to Fig. 2, its construction will be clearly understood. The parts consist essentially of two arms 27, which are pivoted in standards 28, secured to the frame. The outer ends of the arms 27, are provided with a rectangular support 29, in which the axle is designed to rest. At a point between the support 29, and the standards, the arms are provided with an upward extending projection 30, which is adapted to be engaged by a chain 31, or its equivalent which extends to the rear part of the machine, and passes over a pulley 32, and carries at its lower end a counterpoise 33, which is of sufficient weight when the support is raised slightly above the line of draft to cause the said support to assume a vertical position, or that necessary to bring the axle in alignment with the centers 34 and 35. In order to cause the centers to strike the center of the axle exactly a set-screw 36, is employed, which engages with the support, and when once adjusted may be clamped in place so as to prevent its working loose. As the support is designed to extend practically from spindle to spindle, it will readily be seen that when the axle is placed upon the support, and the latter brought to the position necessary to bring the centers into operative position, should the axle be bent or sprung, the centers are bound to be in line, so that when the spindles are turned and the skeins fit thereon, they will be in exact alignment with each other.

The wabble-saws 11 and 12, to which reference has been made are constructed preferably of cast steel and the inclination at which the saws are set with relation to its shaft regulates the depth and also the width of their cut. Thus should a saw be set at such an angle with relation to its axis that a vertical line drawn through the axis will find the saw set two inches to each side thereof, the saw in such an event would make a four inch cut.

The mechanism for revolving the saws consists of a drum 37, which is actuated by means of a belt which passes around the pulley 38, mounted on the shaft thereof, and connecting by means of a belt (not shown) with a suitable source of power. Around the drum extend belts 39, which pass around the pulleys 16, carried by the frames 9 and 10, and from that point to the wabble-saws by means of belts which pass around the pulleys 15 and 17. Of course it is to be understood that the ordinary mechanism employed for causing the wabble-saws to move to or from the blank, as depressions or projections are presented to the tracer by the former, is employed as with the ordinary lathes used for turning irregular forms. If desired two saws may be mounted on each shaft, as shown in Fig. 5.

Having thus described our invention we will explain the manner of its operation. The axle to be operated upon is placed on the support 29, and the latter raised until it abuts against the set-screw 36. The center 35, is then driven into the axle, and is clamped in position by means of a set-screw 40. The support is then brought to its normal position and the machine started. As the tracer comes in contact with the former, the wabble saws are brought into engagement with the axle which latter is being revolved by means of the gearing 21, before referred to. The saws describe a semi-elliptical cut, thus rapidly reducing the stock until the spindle has assumed its proper form. The action of the saws upon the wood is different from the cutters ordinarily employed, inasmuch as the cut is gradual, that is, gradually deepening from the beginning of the cut to its center, and gradually decreasing from its center to the end of the cut, thereby, effectually preventing splitting or riving of the grain of the wood, and at the same time admitting of a much heavier cut being made without the above danger, than with the cutters ordinarily employed.

Having thus fully described our invention, what we claim as new, and desire to secure by Letters Patent, is—

In a lathe for turning wagon axles, the combination, with a screw-shaft and mechanism for revolving the same, of the former of the contour of a completed axle and a plurality of independent cutter-heads, each carrying a wabble-saw and a tracer for engaging the said former, one of the said heads being located at or near the center, whereby when the shaft is revolved one of the saws will cut from the center to the end of the axle while the other is cutting from the end to the center, thus completing an axle in one operation.

In testimony that we claim the foregoing as our own we hereby affix our signatures in presence of two witnesses.

CHARLES F. MILBURN.
GEORGE E. BYRKIT.
JOHN C. CRABBS.

Witnesses:
WILLIAM WEBSTER,
R. M. ELLIOTT.